(12) United States Patent
Ishiyama

(10) Patent No.: US 8,327,197 B2
(45) Date of Patent: Dec. 4, 2012

(54) INFORMATION PROCESSING APPARATUS INCLUDING TRANSFER DEVICE FOR TRANSFERRING DATA

(75) Inventor: Katsuya Ishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 979 days.

(21) Appl. No.: 12/350,644

(22) Filed: Jan. 8, 2009

(65) Prior Publication Data

US 2009/0193322 A1 Jul. 30, 2009

(30) Foreign Application Priority Data

Jan. 25, 2008 (JP) .................................. 2008-014601

(51) Int. Cl.
*G11C 29/00* (2006.01)
(52) U.S. Cl. .......................................... 714/723; 714/6.3
(58) Field of Classification Search .......................... None
See application file for complete search history.

(56) References Cited

U.S. PATENT DOCUMENTS

| | | | | |
|---|---|---|---|---|
| 5,758,056 A * | 5/1998 | Barr | ............................. | 714/6.32 |
| 5,974,544 A * | 10/1999 | Jeffries et al. | ..................... | 713/1 |
| 6,052,798 A * | 4/2000 | Jeddeloh | ....................... | 714/6.13 |
| 6,434,711 B1 * | 8/2002 | Takiyanagi | .................... | 714/5.1 |
| 7,653,847 B1 * | 1/2010 | Liikanen et al. | ............... | 714/723 |
| 2003/0070043 A1 * | 4/2003 | Merkey | ......................... | 711/114 |
| 2004/0003336 A1 * | 1/2004 | Cypher | ......................... | 714/763 |
| 2004/0034809 A1 * | 2/2004 | Versen et al. | ...................... | 714/6 |
| 2004/0268179 A1 * | 12/2004 | Stewart | ............................. | 714/8 |
| 2005/0188280 A1 * | 8/2005 | Ali | .................................. | 714/42 |
| 2007/0220312 A1 * | 9/2007 | Boyd et al. | ........................ | 714/6 |

FOREIGN PATENT DOCUMENTS

| | | |
|---|---|---|
| JP | 53-093735 A | 8/1978 |
| JP | 57-195397 A | 12/1982 |
| JP | 07-152659 | 6/1995 |
| JP | 11-175409 | 7/1999 |

OTHER PUBLICATIONS

Japanese Office Action mailed Jul. 17, 2012 for corresponding Japanese Application No. 2008-014601.

* cited by examiner

*Primary Examiner* — Gabriel Chu
(74) *Attorney, Agent, or Firm* — Fujitsu Patent Center

(57) ABSTRACT

According to an aspect of an embodiment, an apparatus has a first storage, a read write unit for reading and writing data from/into the first storage, a first error detector for detecting an error of data read out from the first storage, an address storage for storing an address of the first storage, a determining unit for determining whether an address of the first storage in which data to be written is matched with the error detected address, a second storage for storing data to be written into the first storage when the address of the first storage in which the data to be written is matched with the error detected address, a second error detector for detecting an error of data read out from the second storage and a selector for outputting one of the data stored in the first storage or the second storage.

15 Claims, 9 Drawing Sheets

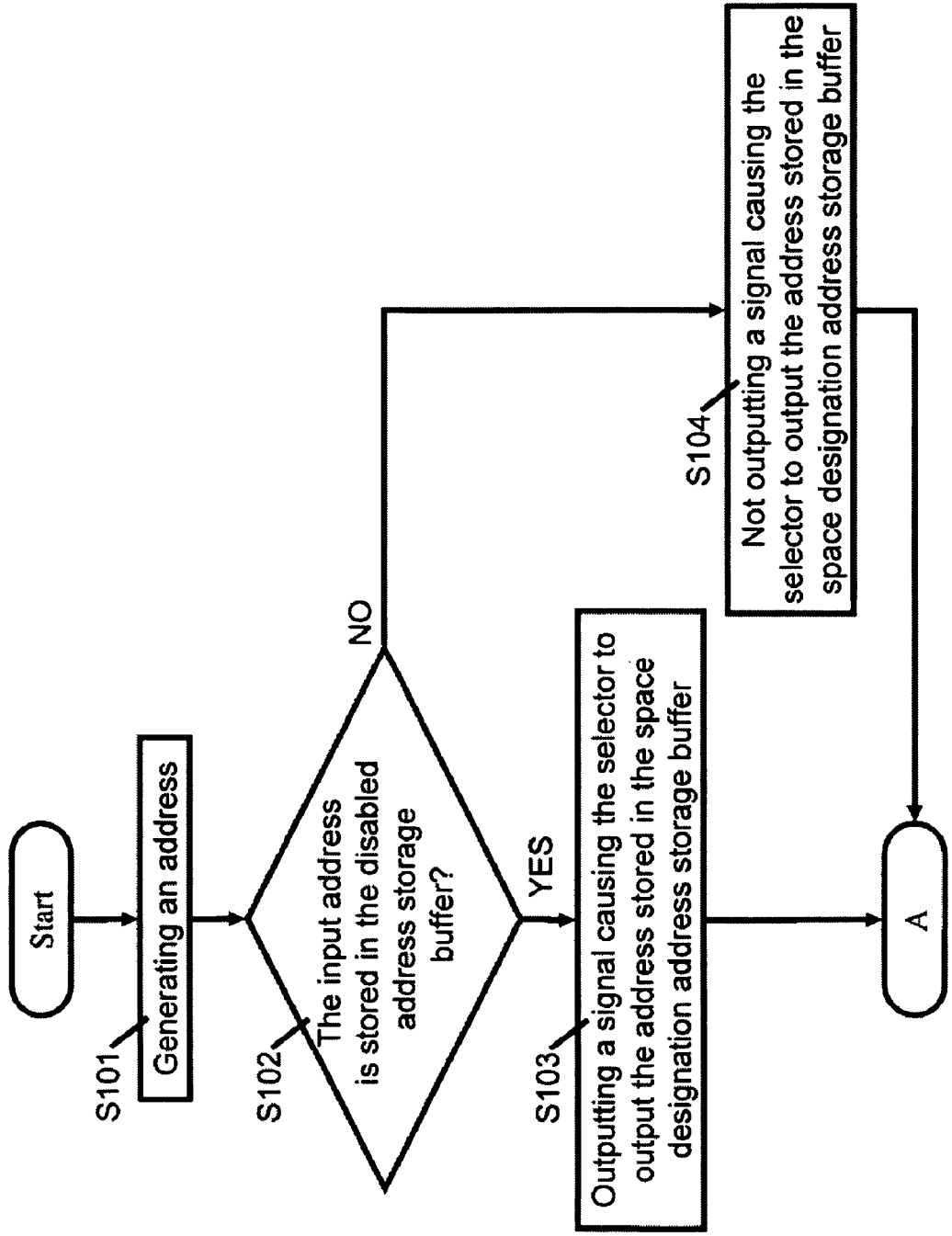

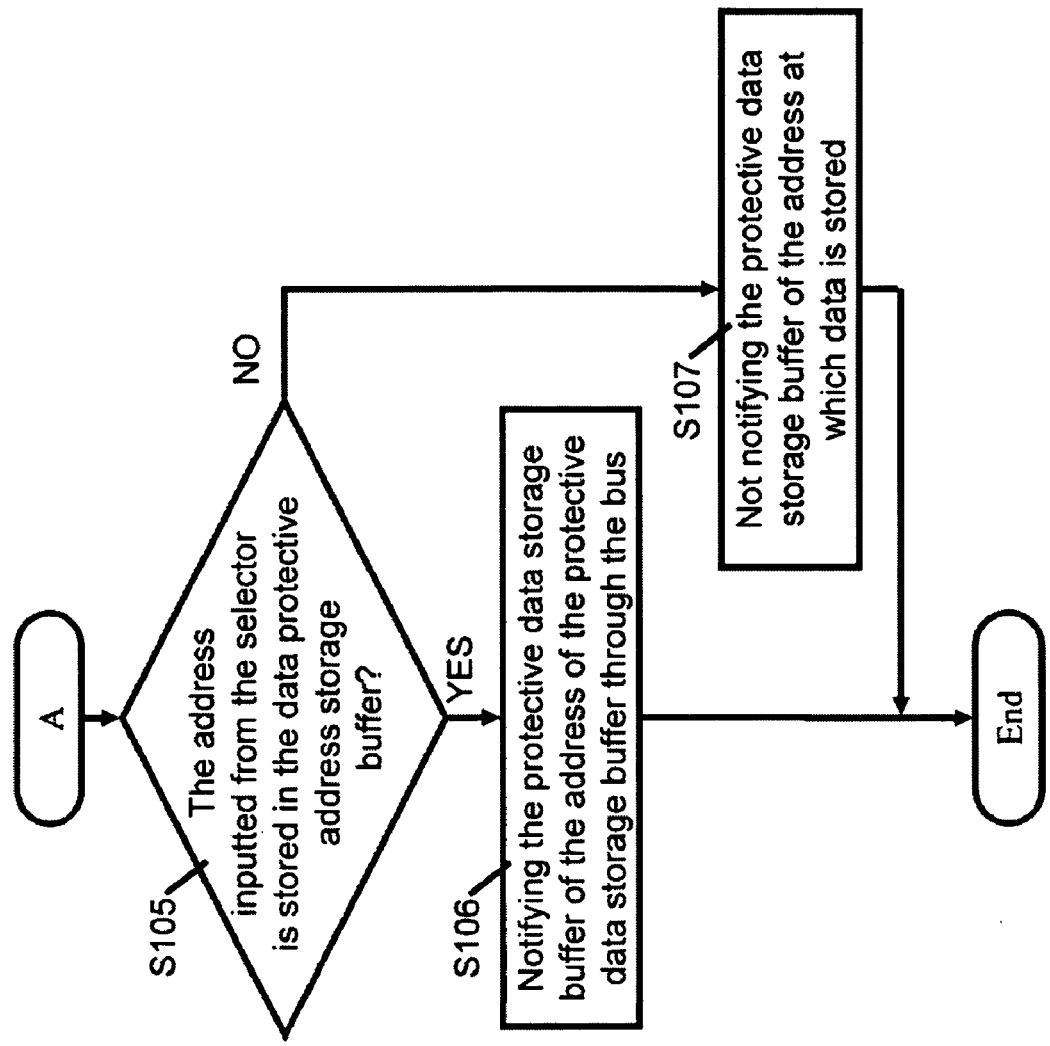

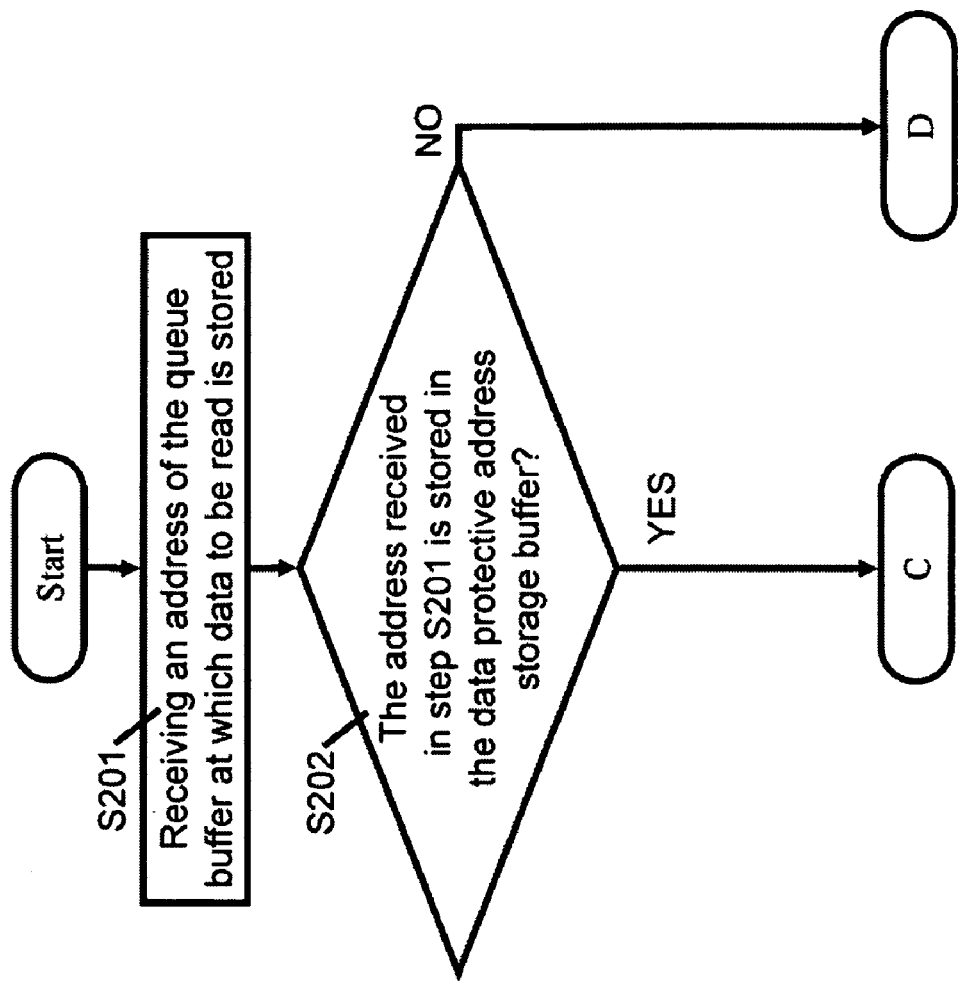

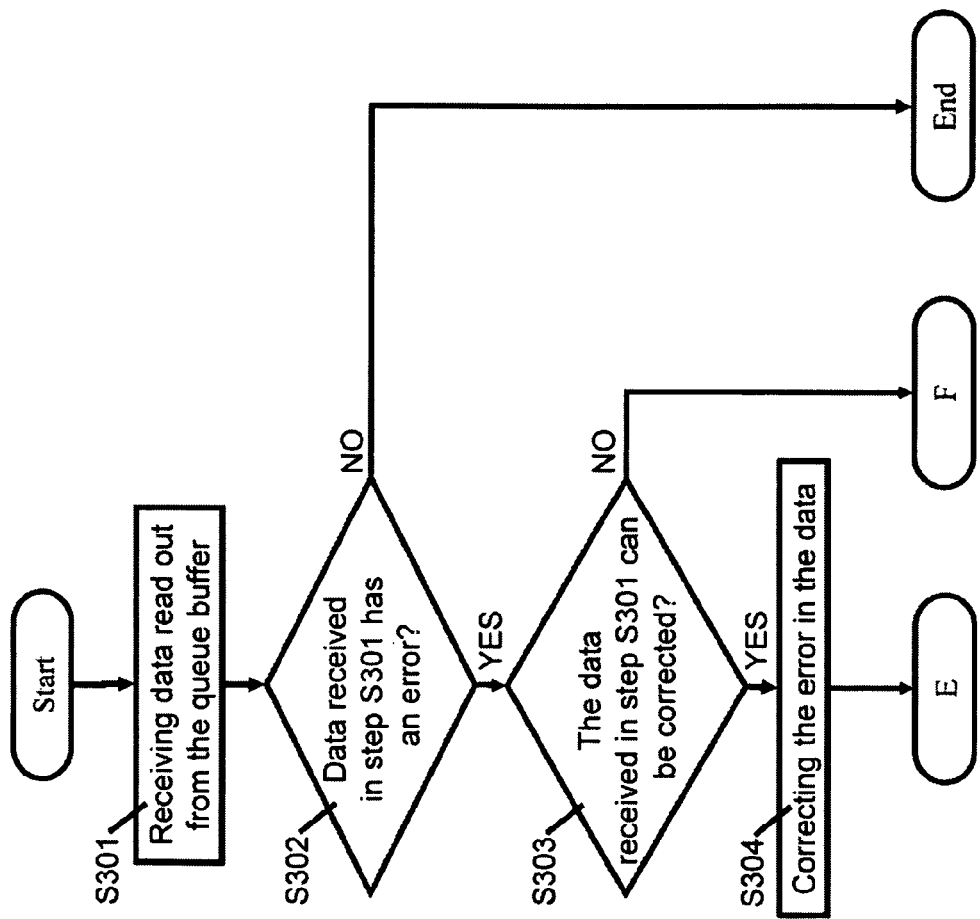

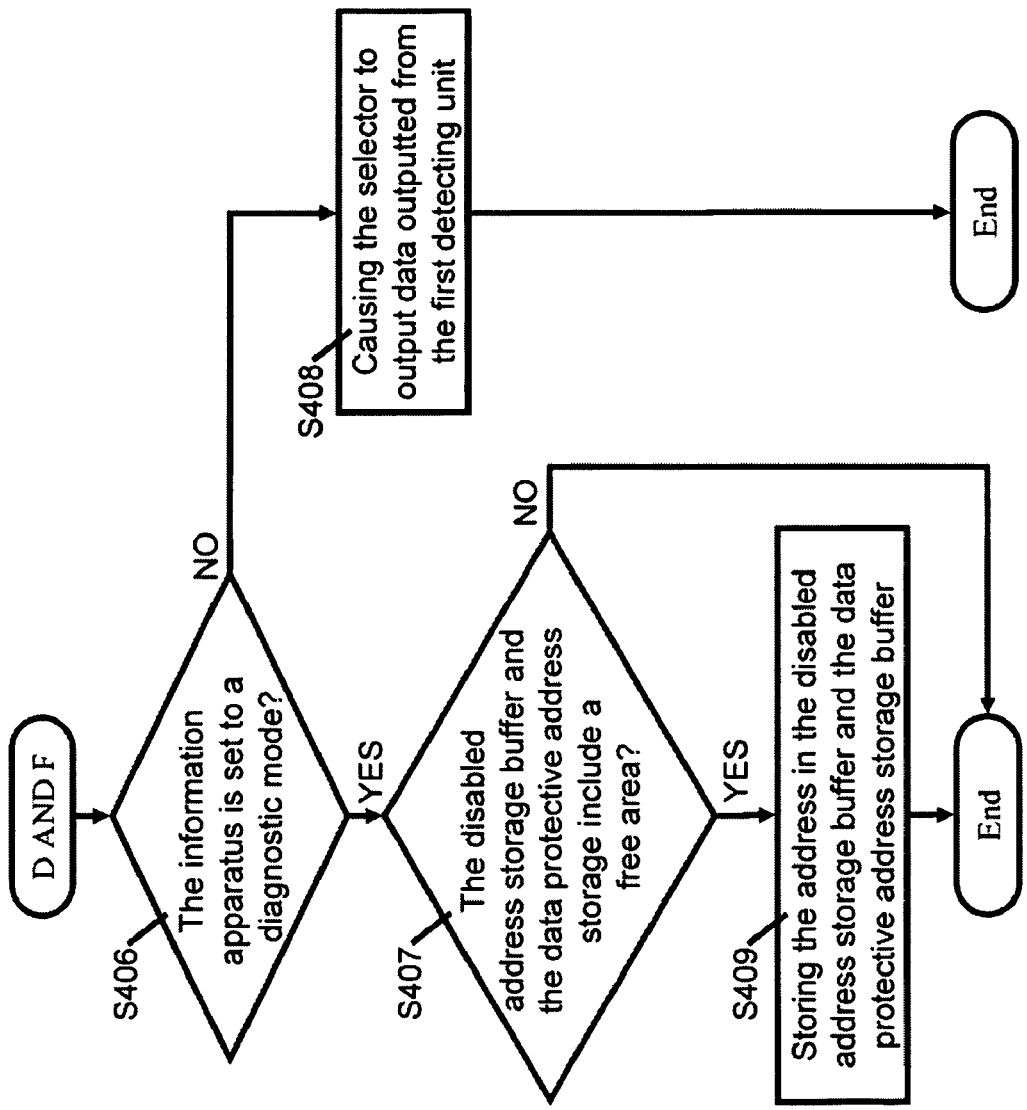

INFORMATION PROCESSING APPARATUS INCLUDING TRANSFER DEVICE FOR TRANSFERRING DATA

CROSS-REFERENCE TO RELATED APPLICATION

This application is based upon and claims the benefit of priority of the prior Japanese Patent Application No. 2008-14601, filed on Jan. 25, 2008, the entire contents of which are incorporated herein by reference.

BACKGROUND

The present technique relates to a transfer device for transferring data. For example, the present technique relates to a transfer device for connecting a processing apparatus for processing data with plural system boards equipped with a memory for storing data.

Some information processing apparatuses incorporate plural units that are physically separated from one another. One unit is, for example, a system board on which a central processing unit (CPU), a memory module, etc. are mounted or an input/output (I/O) board on which I/O devices for a hard disk device, a peripheral component interconnect (PCI) device, etc. are mounted. The system board and the I/O board are connected to a crossbar switch as a transfer device for transmitting/receiving data.

The crossbar switch includes a data buffer control unit. A queue buffer in the data buffer control unit stores data transmitted or received between system boards or I/O boards. The queue buffer stores data transmitted from any system board in the order in which the data was received. The queue buffer is composed of a flip-flop or a memory device such as a random access memory (RAM). Data stored in the memory device is at risk of being corrupted. A soft-error is one of the factors that corrupt data. The soft-error is a phenomenon that an amount of charges accumulated in a memory device is changed when an α beam having charges and emitted from uranium contained in a semiconductor package or a wiring material impinges on the memory device. If a critical charge amount of a flip-flop is reduced due to a low-voltage operation or the like, the soft-error easily occurs and system reliability is lowered.

To describe an example of mechanisms for increasing system reliability, two queue buffers having the same capacity are prepared to construct a completely duplexed queue buffer. However, such a duplexed queue buffer causes an increase in hardware components and in turn, an increase in system cost.

Technique of the related art is disclosed in Japanese Laid-open Patent Publication No. 53-093735 and Japanese Laid-open Patent Publication No. 57-195397.

SUMMARY

According to an aspect of an embodiment, an apparatus has a first storage for storing data, a read write unit for reading and writing data from and into the first storage, a first error detector for detecting an error of data read out from the first storage, an address storage for storing an address of the first storage where the error has been detected, a determining unit for determining whether an address of the first storage in which data to be written is matched with the error detected address stored in the address storage when the read write unit is writing data into the first storage, a second storage for storing data to be written into the first storage by the read write unit when the address of the first storage in which the data to be written is matched with the error detected address, a second error detector for detecting an error of data read out from the second storage and a selector for selectively outputting one of the data stored in the first storage or the second storage on the basis of an error detection result of the first error detector and the second error detector.

BRIEF DESCRIPTION OF THE DRAWINGS

FIG. 3 is a flowchart (I) of write processing;
FIG. 4 is a flowchart (II) of write processing;
FIG. 5 is a flowchart (I) of read processing;
FIG. 6 is a flowchart (II) of read processing;
FIG. 9 is a flowchart (V) of read processing.

DESCRIPTION OF THE PREFERRED EMBODIMENTS

Hereinafter, embodiments of the present technique will be described with reference to the accompanying drawings.

Figure 1:
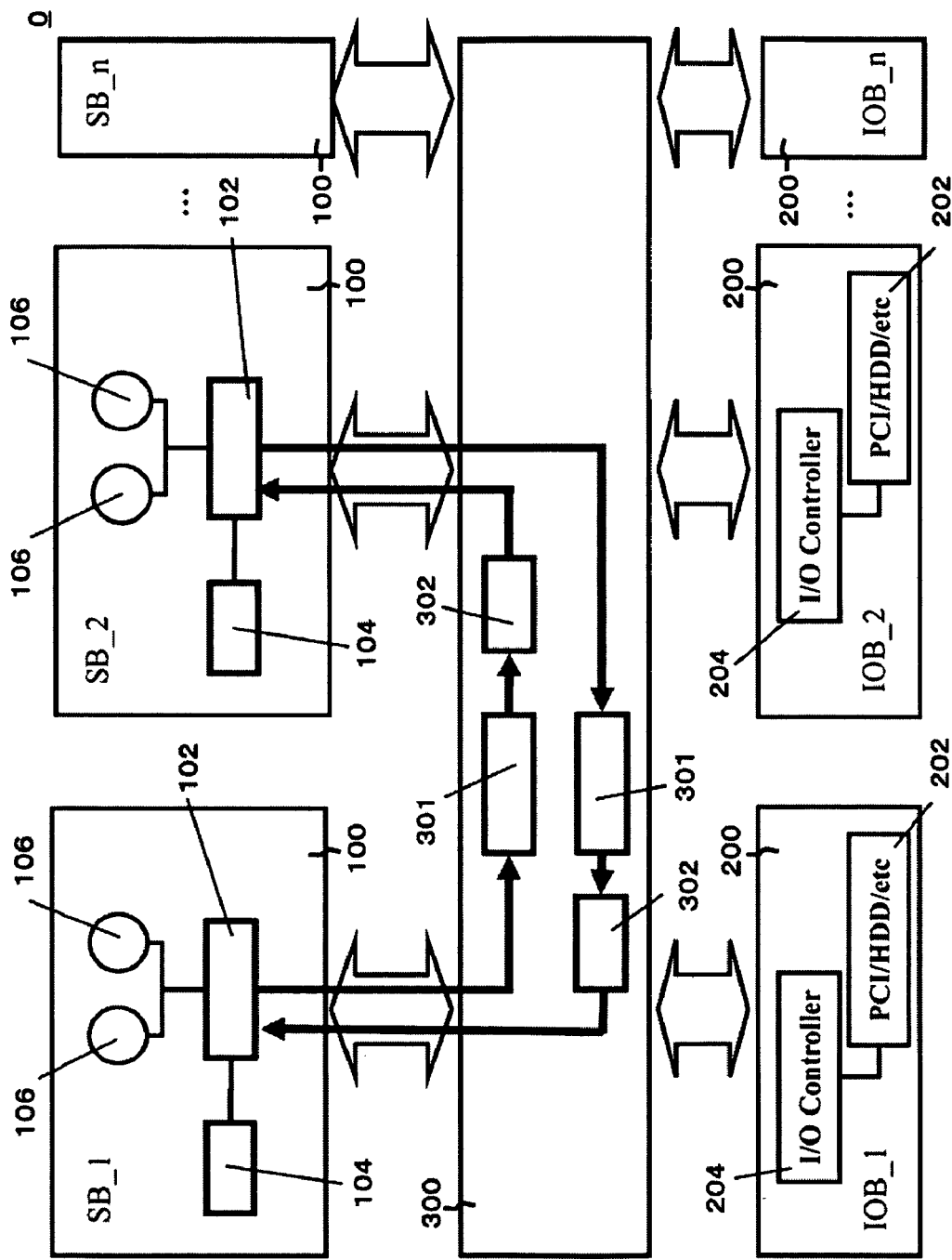
FIG. 1 shows the configuration of an information processing apparatus.

FIG. 1 shows an information processing apparatus 0 according to an embodiment of the present technique. The information processing apparatus 0 has, for example, n system board 100 and n input/output (I/O) boards 200 (n is a natural number). The number of system board may be different from the number of I/O boards.

Each system board 100 includes a central processing unit (CPU) 106, a memory controller 102 and a memory module 104. The memory controller 102 accesses the memory module 104 based on a command sent from the CPU 106. Then, the memory controller 102 writes data into or reads data from the memory module 104. Further, the memory controller 102 sends out data, the data read out from the memory module 104 toward the CPU 106. The memory module 104 is a dual inline memory module (DIMM) incorporating plural dynamic random access memories (DRAMs).

Each I/O board 200 includes a PCI device 202 for example. The I/O board 200 is used to establish connection with an I/O for a hard disk drive (HDD), a local area network, or the like. An I/O controller 204 controls the PCI device 202.

Each system board 100 and each I/O board 200 are connected to a crossbar switch 300 so as to transfer data between any system board 100 and any I/O board 200. A crossbar switch 300 includes a data buffer control unit 301 and an arbiter 302. The data buffer control unit 301 stores data transmitted from one system board 100 to another, for example. The stored data is subjected to arbitration with the arbiter 302 and then sent out to a target system board 100.

Figure 2:
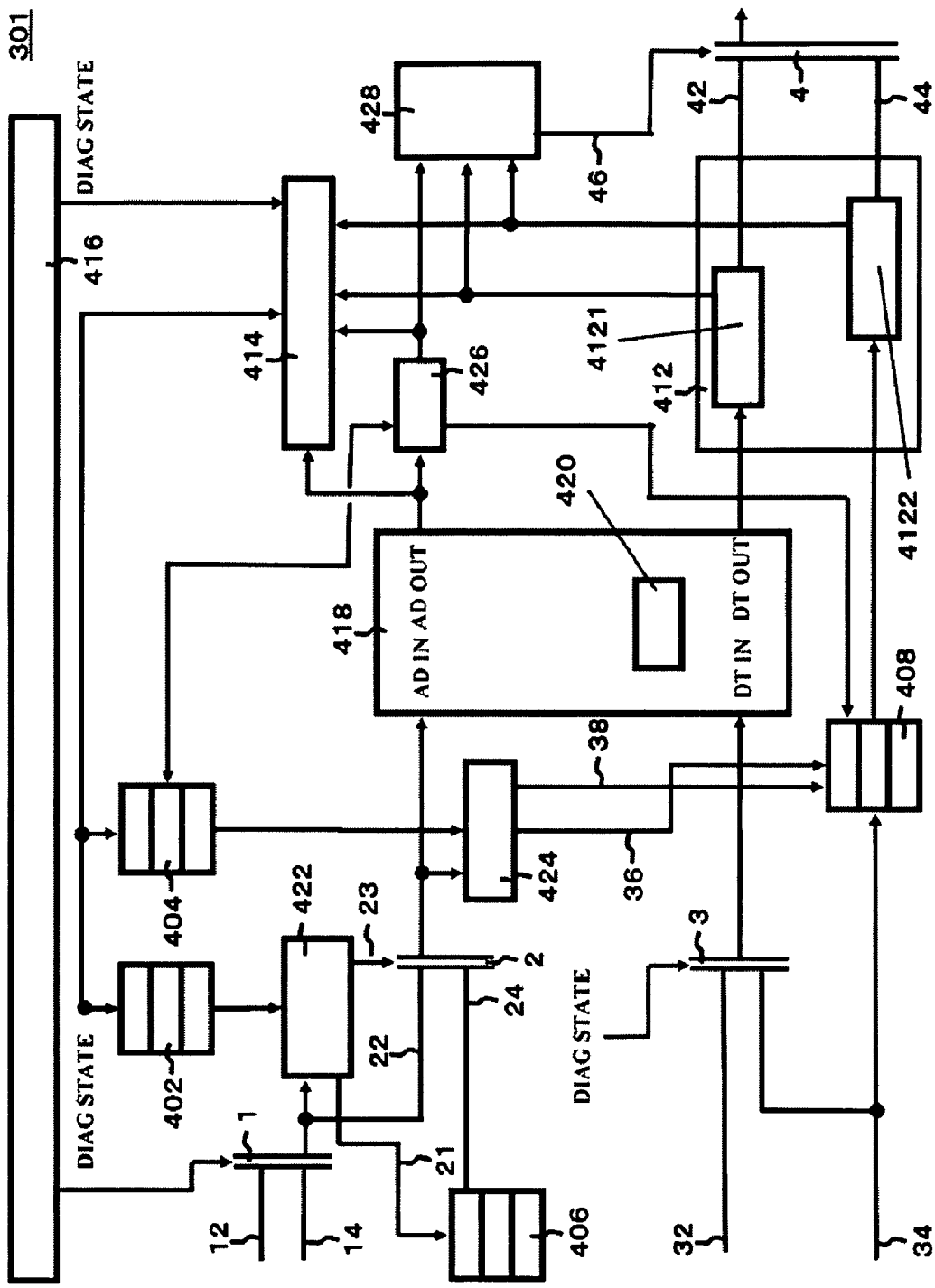
FIG. 2 shows the detailed configuration of a data buffer control unit provided in a crossbar switch.

FIG. 2 shows the detailed configuration of the data buffer control unit 301 provided in the crossbar switch 300. The data buffer control unit 301 includes a disabled address storage buffer 402, a data protective address storage buffer 404, a spare space designation address storage buffer 406, a protective data storage buffer 408, a read error monitor mechanism 412, an address storage buffer registration control mechanism 414, a diagnosis control state machine 416, a queue buffer 418 and a spare space 420.

The queue buffer 418 is used to input/output data in the order in which the data was received. The queue buffer 418 is composed of a flip-flop or a RAM.

Firstly, processing for reading data from the queue buffer 418 is described. The read error monitor mechanism 412 has a first detecting unit 4121 and a second detecting unit 4122. The first detecting unit 4121 detects and corrects an error in data read out from the queue buffer 418. Data read out from the queue buffer 418 is added with, for example, an error correcting code (ECC). The first detecting unit 4121 detects and corrects an error based on the read data and the error correcting code added to the data. A 1-bit error is automatically corrected through error detection and error correction to allow the information processing apparatus 0 to keep operating. A 2-bit error can be surely detected. If detecting an error in data read out from the queue buffer 418, the first detecting unit 4121 notifies the address storage buffer registration control mechanism 414 of an address of the queue buffer 418 that stored the data whose error was detected. The second detecting unit 4122 is described later.

The address storage buffer registration control mechanism 414 receives data about an address where data read out from the queue buffer 418 was stored. Further, as described above, the first detecting unit 4121 notifies the address storage buffer registration control mechanism 414 that an error is detected in the read data. The address storage buffer registration control mechanism 414 stores the address that caused a read error in the disabled address storage buffer 402 and the data protective address storage buffer 404 based on the notification. Further, the address storage buffer registration control mechanism 414 may preferentially store addresses that tend to cause an error in the disabled address storage buffer 402 and the data protective address storage buffer 404 based on the notification from the first detecting unit 4121.

The disabled address storage buffer 402 stores an address of the queue buffer 418, at which a read error occurred. With this operation, if a command to write data into the address is issued, the data is written into the prepared spare space 420 in the queue buffer 418, not into the address. In this way, the data can be prevented from being written into the address of the queue buffer 418, which is more likely to cause an error. Hence, data reliability is increased. Further, the data protective address storage buffer 404 also stores the address at which a read error occurred. Thus, when a command to write data into any address is issued, if the target address is found in the data protective address storage buffer 404 with reference to the data protective address storage buffer 404, the write data may be additionally written into the protective data storage buffer 408. Thus, in the case of writing data into an address that tends to cause an error, the data can be copied.

Next, data write processing is described. A diagnostic address and a general address are inputted into a selector 1 through a bus 12 and a bus 14, respectively. The diagnostic address and the general address are generated by a diagnostic address generating unit and a general address generating unit, respectively. These address generating units are provided in the crossbar switch 300. In addition, these address generating units are used to control data inputted into and outputted from the queue buffer 418. The information processing apparatus 0 is switched between a diagnostic mode and a general mode by the diagnosis control state machine 416. In the case of setting the information processing apparatus 0 to the diagnostic mode, the diagnosis control state machine 416 inputs a diagnostic signal into the selector 1 through the bus. The diagnostic signal is denoted as "DIAG STATE" in FIG. 2. If receiving the diagnostic signal, the selector 1 can output diagnostic data inputted from the bus 12. On the other hand, if the case of setting the information processing apparatus 0 to the general mode, the diagnosis control state machine 416 does not input any diagnostic signal into the selector 1 through the bus. As a result, the selector 1 can output general data inputted from a bus 14. The diagnostic mode is described below.

A first comparison unit 422 compares an address inputted from the selector 1 with an address stored in the disabled address storage buffer 402. If determining that the address inputted from the selector 1 matches with the address stored in the disabled address storage buffer 402 as a result of comparison, the first comparison unit 422 inputs a signal indicating that the addresses match each other, into the spare space designation address storage buffer 406 through a bus 21. The spare space designation address storage buffer 406 inputs an alternative address into the selector 2 through a bus 24 based on the signal sent from the first comparison unit 422.

An address sent from the selector 1 and an alternative address are inputted into the selector 2 through a bus 22 and the bus 24, respectively. If no signal is inputted into a bus 23, the selector 2 outputs an address inputted from the bus 22 to a second comparison unit 424 as a determination unit and the queue buffer 418. On the other hand, if any signal is inputted to the bus 23, the selector 2 outputs an alternative address to the second comparison unit 424 and the queue buffer 418. The alternative address corresponds to an address of the spare space 420.

On the other hand, diagnostic data and normal data are inputted into a selector 3 through a bus 32 and a bus 34, respectively. The general data is sent from the system board 100 and inputted into the bus 34. In the case of setting the information processing apparatus 0 to a diagnostic mode, the diagnosis control state machine 416 inputs a diagnostic signal into the selector 3 through the bus. As a result, the selector 3 can output diagnostic data inputted from the bus 32. On the other hand, in the case of setting the information processing apparatus 0 to a normal mode, the diagnosis control state machine 416 does not input any diagnostic signal to the selector 3 through the bus. As a result, the selector 3 can output general data inputted from the bus 34.

If an address is inputted from the selector 2, the second comparison unit 424 compares the address with an address stored in the data protective address storage buffer 404. If determining that the address inputted from the selector 2 matches the address stored in the data protective address storage buffer 404 as a result of comparison, the second comparison unit 424 notifies the protective data storage buffer 408 of an address where data inputted from the bus 34 is stored, through a bus 36. Further, if a command to write data is issued, the second comparison unit 424 sends out a command to latch data inputted from the bus 34 toward the protective data storage buffer 408 through a bus 38. The protective data storage buffer 408 stores data inputted from the bus 34 based on the address notified by the second comparison unit 424 and the command sent from the second comparison unit 424. With this operation, in the case of writing data into an address of the queue buffer 418 at which a read error is occurred, the data is additionally written into the protective data storage buffer 408 to thereby increase reliability of data to be written. In addition, since a capacity of the protective data storage buffer 408 is smaller than that of the queue buffer 418, data reliability can be enhanced without largely increasing the number of hardware components of the information processing apparatus 0.

On the other hand, if determining that the address inputted from the selector 2 does not match the address stored in the data protective address storage buffer 404 as a result of comparison, the second comparison unit 424 neither notifies the protective data storage buffer 408 of the address nor sends out a command to latch data. Since no address is notified by the second comparison unit 424 and no latch command is sent out, the protective data storage buffer 408 does not store data inputted from the bus 34.

Moreover, in the case of inputting an alternative address to the second comparison unit 424 from the selector 2, the spare space 420 stores data based on the alternative address and data inputted from the selector 3. In this way, if a command to write data to an address of the queue buffer 418, at which a read error occurred, is issued, the data is written into the spare space 420 to thereby improve reliability of the data.

Subsequently, data read processing is described. A third comparison unit 426 receives an address of the queue buffer 418, at which data read out by the first detecting unit 4121 was stored, from the queue buffer 418. The queue buffer 418 sends out the data to the first detecting unit 4121. Then, the third comparison unit 426 makes a comparison to determine whether the read address matches an address stored in the data protective address storage buffer 404 or not. The third comparison unit 426 determines whether data stored in the queue buffer 418 is also stored in the protective data storage buffer 408 or not by the comparison. If determining that the read address matches an address stored in the data protective address storage buffer 404, the third comparison unit 426 notifies the protective data storage buffer 408 of an address of the queue buffer 418 where the data is stored. The protective data storage buffer 408 outputs data stored in association with the data read out from the queue buffer 418 to the second detecting unit 4122 based on the address of the queue buffer 418 notified by the third comparison unit 426. Further, the third comparison unit 426 notifies the address storage buffer registration control mechanism 414 of the comparison result. When the address storage buffer registration control mechanism 414 receives a notification that the read address matches the address stored in the data protective address storage buffer 404 from the third comparison unit 426, for example, if an error in the data, which was detected with the first detecting unit 4121, cannot be corrected, the address storage buffer registration control mechanism 414 stores the read address in the disabled address storage buffer 402. Further, when the address storage buffer registration control mechanism 414 receives a notification that the read address does not match the address stored in the data protective address storage buffer 404 from the third comparison unit 426, for example, if an error in the data, which was detected with the first detecting unit 4121, can be corrected, the address storage buffer registration control mechanism 414 stores the read address in the data protective address storage buffer 404.

The first detecting unit 4121 detects and corrects an error in data inputted from the queue buffer 418. Then, the first detecting unit 4121 notifies a data selecting unit 428 whether an error is detected or not. The first detecting unit 4121 outputs corrected data to a selector 4 through a bus 42 if an error is found in the data. Or the first detecting unit 4121 outputs the data if no error is found in the data. Likewise, the second detecting unit 4122 detects and corrects an error in data inputted from the protective data storage buffer 408. Then, the second detecting unit 4122 notifies a data selecting unit 428 whether an error is detected or not. The second detecting unit 4122 outputs corrected data to the selector 4 through a bus 44 if an error is found in the data. Or the second detecting unit 4122 outputs the data if no error is found in the data.

The first detecting unit 4121 or the second detecting unit 4122 notifies the data selecting unit 428 whether an error is detected or not. If receiving a notification that an error is detected from the first detecting unit 4121, the data selecting unit 428 inputs a selection control signal to the selector 4 through a bus 46. As a result, the selector 4 outputs data inputted from the bus 44. On the other hand, if receiving a notification that no error is detected from the first detecting unit 4121, the data selecting unit 428 does not input a selection control signal to the selector 4 through the bus 46. As a result, the selector 4 outputs data inputted from the bus 42.

The data outputted from the selector 4 is inputted to the arbiter 302 in the crossbar switch 300. Any arbitrator known in this technical field may be used as the arbiter 302. The arbiter 302 sends out the data to a corresponding system board 100. With this operation, an errorless data can be selected from data outputted from the first detecting unit 4121 or data outputted from the second detecting unit 4122. And then the selected data is outputted from the selector 4. Thus, data reliability can be increased.

Next, the diagnostic mode is described. The diagnostic mode refers to a mode for detecting an abnormality in the information processing apparatus 0 prior to an operation of the information processing apparatus 0 in a general mode. As described above, if the information processing apparatus 0 is set to the diagnostic mode, the diagnosis control state machine 416 inputs a diagnostic signal to the selectors 1 and 3. Then, the selector 1 can output a diagnostic address and the selector 3 can output diagnostic data. In the diagnostic mode, data is first written into the spare space 420. Then, the first detecting unit 4121 reads out the written data, detects an error, and if an error is detected in the read data, disables an address of the spare space 420 where the data having an error was stored. For example, it is possible to disable the spare space designation address storage buffer 406 corresponding to the address of the spare space 420 where the data having an error was stored. A general space of the queue buffer 418 is subjected to similar diagnostic processing, and an address where data having an error was stored is disabled. As a result, an address of the queue buffer 418, at which data causing a read error was stored, can be disabled in a general mode. Further, the address storage buffer registration control mechanism 414 may store an address that caused a read error, in the disabled address storage buffer 402 and the data protective address storage buffer 404, for example. With this operation, in a general mode, the information processing apparatus 0 can improve data reliability based on the address stored in these buffers.

The diagnosis control state machine 416 notifies a notify party of a diagnosis result or a state of the queue buffer 418 to thereby manage the information processing apparatus 0. Here, the "state of the queue buffer 418" means that a read error cannot be corrected, that an address that caused a read error is stored in the disabled address storage buffer 402, and a disabled address of the queue buffer 418. Further, the "notify party" means an upper module or maintenance person. With the above operation, a maintenance person can perform maintenance at appropriate timing, so a highly-reliable and flexible information processing apparatus 0 can be achieved.

Next, write processing and read processing are described with reference to a flowchart. Firstly, processing for writing data into the queue buffer 418 is described.

In step S101 in FIG. 3, the address generating unit generates an address of the queue buffer 418 where data is written. The address is inputted from the bus 14 to the selector 1. The selector 1 outputs the input address to the first comparison unit 422 and the selector 2. The processing advances to step S102.

In step S102, the first comparison unit 422 determines whether the input address is stored in the disabled address storage buffer 402 or not. If the input address is stored in the disabled address storage buffer 402, the processing advances to step S103. On the other hand, if the input address is not stored in the disabled address storage buffer 402, the processing advances to step S104.

In step S103, the first comparison unit 422 outputs a signal that causes the selector 2 to output the address stored in the spare space designation address storage buffer 406, toward the selector 2. As a result, the selector 2 can output the address stored in the spare space designation address storage buffer 406 to the queue buffer 418 and the second comparison unit 424. The processing advances to step S105 in FIG. 4.

In step S104, the first comparison unit 422 does not output a signal that causes the selector 2 to output the address stored in the spare space designation address storage buffer 406, toward the selector 2. As a result, the selector 2 can output an address inputted from the selector 1 through the bus 22, to the queue buffer 418 and the second comparison unit 424. The processing advances to step S105 in FIG. 4.

In step S105, the second comparison unit 424 determines whether the address inputted from the selector 2 is stored in the data protective address storage buffer 404 or not. If the input address is stored in the data protective address storage buffer 404, the processing advances to step S106. On the other hand, if the input address is not stored in the data protective address storage buffer 404, the processing advances to step S107.

In step S106, the second comparison unit 424 notifies the protective data storage buffer 408 of the address of the protective data storage buffer 408, at which data is stored, through the bus 36. Further, the second comparison unit 424 outputs a signal for latching data inputted to the protective data storage buffer 408 through the bus 38. As a result, the protective data storage buffer 408 can store data at an address corresponding to the address stored in the data protective address storage buffer 404. Thus, if the first detecting unit 4121 outputs data from the queue buffer 418 in the read processing as described later, the second detecting unit 4122 can read out data corresponding to the data from the protective data storage buffer 408 as well. The processing is terminated.

In step S107, the second comparison unit 424 does not notify the protective data storage buffer 408 of the address at which data is stored. As a result, the protective data storage buffer 408 does not store data at an address corresponding to the address stored in the data protective address storage buffer 404. The processing is terminated.

Next, processing for reading data from the queue buffer 418 is described. In step S201 in FIG. 5, the third comparison unit 426 receives an address of the queue buffer 418, at which data to be read out is stored. The processing advances to step S202.

In step S202, the third comparison unit 426 determines whether the address received in step S201 is stored in the data protective address storage buffer 404 or not. If the address is stored in the data protective address storage buffer 404, the processing advances to step S401 in FIG. 7 or step S405 in FIG. 8. On the other hand, if the address is not stored in the data protective address storage buffer 404, the processing advances to step S406 in FIG. 9 or step S410 in FIG. 10.

In step S301 in FIG. 6, the first detecting unit 4121 receives data read out from the queue buffer 418. The processing advances to step S302.

In step S302, the first detecting unit 4121 determines whether the data received in step S301 has an error or not. If the data has an error, the processing advances to step S303. On the other hand, if the data has no error, the processing is terminated.

In step S303, the first detecting unit 4121 determines whether the data received in step S301 can be corrected or not. If the data can be corrected, the processing advances to step S304. On the other hand, if the data cannot be corrected, the processing advances to step S401 in FIG. 7 and step S406 in FIG. 9.

In step S304, the first detecting unit 4121 corrects the error in the data. The processing advances to step S405 in FIG. 8 or step S410 in FIG. 10.

Subsequently, description is given of the case where a determination result is positive in step S202 in FIG. 5 and a determination result is negative in step S303 in FIG. 6.

Figure 7:
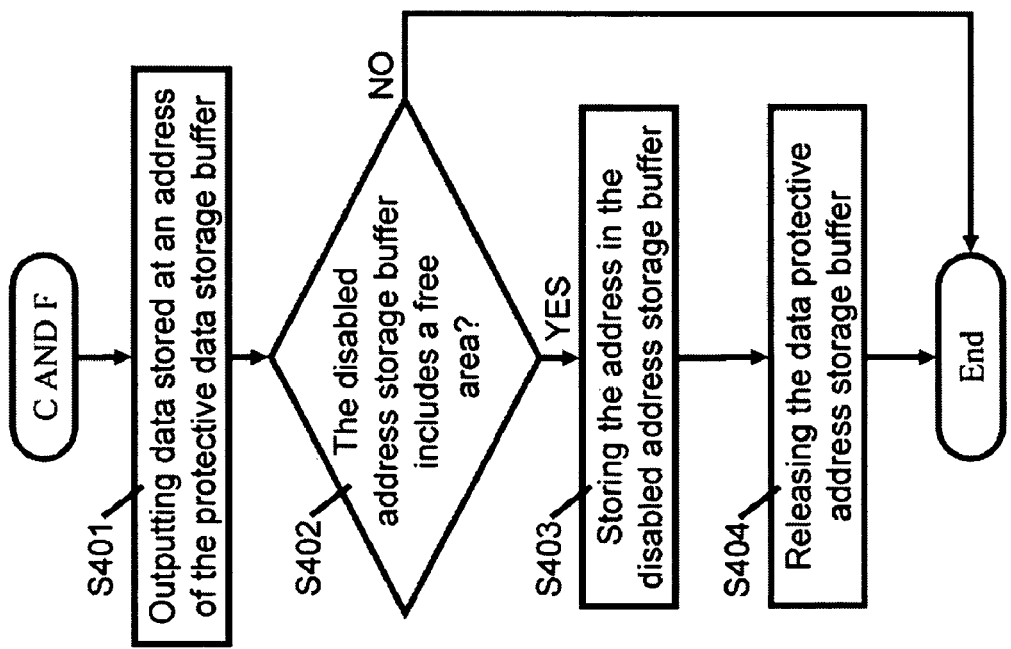
FIG. 7 is a flowchart (III) of read processing.

In step S401 in FIG. 7, the third comparison unit 426 outputs data stored at an address of the protective data storage buffer 408 corresponding to the address stored in the data protective address storage buffer 404 toward the second detecting unit 4122. The processing advances to step S402.

In step S402, the third comparison unit 426 determines whether the disabled address storage buffer 402 includes a free area or not. If the disabled address storage buffer 402 includes a free area, the processing advances to step S403. On the other hand, if the disabled address storage buffer 402 includes no free area, the processing is terminated.

In step S403, the address storage buffer registration control mechanism 414 stores the address in the disabled address storage buffer 402. The processing advances to step S404.

In step S404, the address storage buffer registration control mechanism 414 releases the data protective address storage buffer 404 and the protective data storage buffer 408 to enable entry of a new address. The processing is terminated.

Next, description is given of the case where a determination result is positive in step S202 in FIG. 5 and a determination result is positive in step S303 in FIG. 6.

Figure 8:
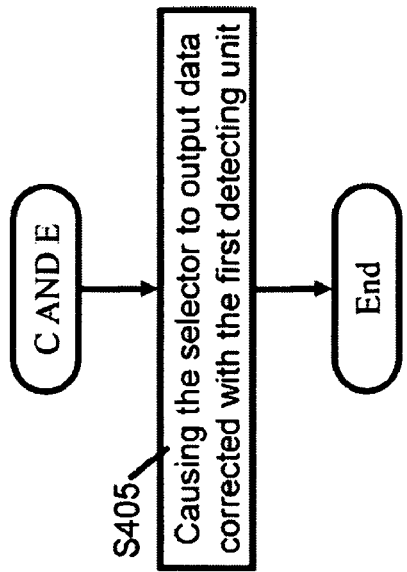
FIG. 8 is a flowchart (IV) of read processing.

In step S405 in FIG. 8, the data selecting unit 428 causes the selector 4 to output data corrected by the first detecting unit 4121. More specifically, since the data selecting unit 428 outputs no signal to the selector 4, the selector 4 can output data inputted from the bus 42. The processing is terminated.

Subsequently, description is given of the case where a determination result is negative in step S202 in FIG. 5 and a determination result is negative in step S303 in FIG. 6.

In step S406 in FIG. 9, the address storage buffer registration control mechanism 414 determines whether the information processing apparatus 0 is set to a diagnostic mode or not. To be specific, the address storage buffer registration control mechanism 414 makes determination based on whether a diagnostic signal is inputted from the diagnosis control state machine 416 or not. If the information processing apparatus 0 is set to a diagnostic mode, the processing advances to step S407. If the information processing apparatus 0 is not set to a diagnostic mode, the processing advances to step S408.

In step S408, the data selecting unit 428 causes the selector 4 to output data outputted from the first detecting unit 4121. The processing is terminated.

In step S407, the address storage buffer registration control mechanism 414 determines whether the disabled address storage buffer 402 and the data protective address storage buffer 404 include a free area or not. If a free area is found, the processing advances to step S409. On the other hand, if no free area is found, the processing is terminated.

In step S409, the address storage buffer registration control mechanism 414 stores the address in the disabled address storage buffer 402 and the data protective address storage buffer 404. The processing is terminated.

Subsequently, description is given of the case where a determination result is negative in step S202 in FIG. 5 and a determination result is positive in step S303 in FIG. 6.

Figure 10:
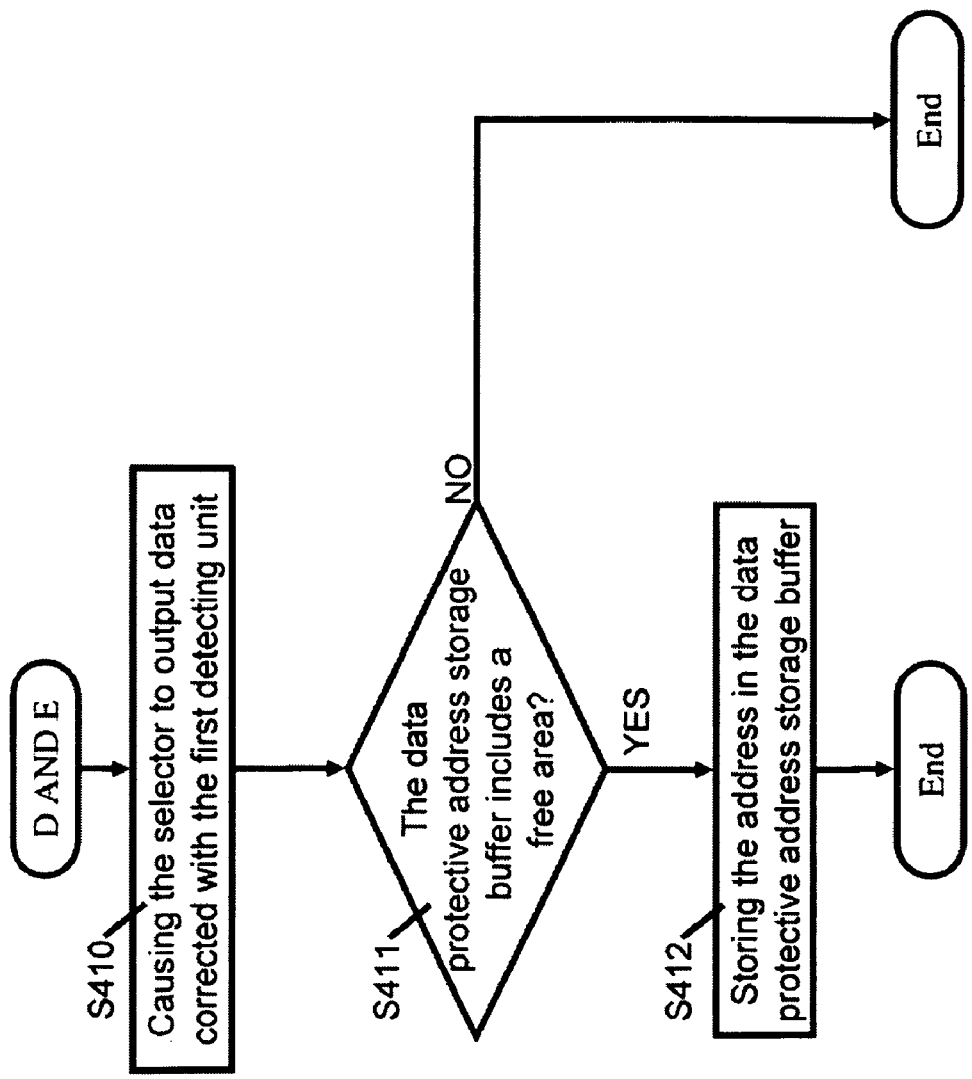
FIG. 10 is a flowchart (VI) of read processing.

In step S410 in FIG. 10, the data selecting unit 428 causes the selector 4 to output data corrected by the first detecting unit 4121. The processing advances to step S411.

In step S411, the address storage buffer registration control mechanism 414 determines whether the data protective address storage buffer 404 includes a free area or not. If the data protective address storage buffer 404 includes a free area, the processing advances to step S412. On the other hand, the data protective address storage buffer 404 includes no free area, the processing is terminated.

In step S412, the address storage buffer registration control mechanism 414 stores the address in the data protective address storage buffer 404. The processing is terminated.

According to the present technique, if data is written into an address of the first storage unit, which causes a read error, the data is also written into the second storage unit. Thus, no data is written into the second storage unit if data is written into any address of the first storage unit other than the address that causes a read error. Therefore, system reliability can be increased with a capacity of the second storage unit being set smaller than that of the first storage unit.

The above description is given to promote the understanding of the embodiment of the present technique, not to limit other applications. Accordingly, the present technique can be modified without departing from the scope of the technique. The above embodiment describes the data transmitting/receiving processing between the system boards 100, but this embodiment is applicable to data transmitting/receiving processing between the I/O boards 200.

What is claimed is:

1. An apparatus comprising:
a first storage to store first data;
a read write unit to read and write the first data from and into the first storage;
a first error detector to detect an error of the first data read from the first storage;
an address storage to store an address of the first storage where the error has been detected;
a determining unit to determine whether an address of the first storage in which the first data to be written is matched with the error detected address stored in the address storage when the read write unit is writing the first data into the first storage;
a second storage to store second data to be written into the first storage by the read write unit when the address of the first storage in which the second data to be written is matched with the error detected address;
a second error detector to detect an error of the second data read from the second storage; and
a selector to selectively output one of the first or second data stored in the first storage or the second storage on the basis of an error detection result of the first error detector and the second error detector.

2. The apparatus of claim 1, wherein the selector outputs the data stored in the address of the first storage when the second error detector detects an error.

3. The apparatus of claim 1, wherein the selector outputs the data stored in the address of the second storage when the first error detector detects an error.

4. The apparatus of claim 1, wherein the first storage further comprises a backup storage.

5. The apparatus of claim 4, wherein the backup storage stores the first data when the address of the first storage is matched with the error detected address.

6. An apparatus having a plurality of system boards including a processor and a memory, each of the system boards being connected to other system boards via a transfer device for transferring data, the apparatus comprising:
a first storage to store first data;
a read write unit to read and write the first data from and into the first storage;
a first error detector to detect an error of the first data read from an address of the first storage;
an address storage to store the address of the first storage where the error has been detected;
a determining unit to determine whether an address of the first storage is matched with the error detected address or not in reference to the address storage when the read write unit is writing the first data into the address of the first storage;
a second storage to store second data to be written into the address of the first storage by the read write unit when the address of the first storage is matched with the error detected address;
a second error detector to detect an error of the second data read from the second storage; and
a selector to selectively output one of the first or second data stored in the first storage or the second storage on the basis of an error detection result of the first error detector and the second error detector.

7. The apparatus of claim 6, wherein the selector outputs the data stored in the address of the first storage when the second error detector detects an error.

8. The apparatus of claim 6, wherein the selector outputs the data stored in the address of the second storage when the first error detector detects an error.

9. The apparatus of claim 6, wherein the first storage further comprises a backup storage.

10. The apparatus of claim 9, wherein the backup storage stores the first data when the address of the first storage is matched with the error detected address.

11. A method comprising:
reading data from a first storage;
first data error determining whether an error of first data read from the first storage is detected;
determining whether an address of the first storage in which the first data to be written is matched with an error detected address when writing the first data into the first storage;
storing, into a second storage, second data to be written into the first storage when the address of the first storage is matched with the error detected address;
second data error determining whether an error of the second data read from the second storage is detected; and
selectively outputting one of the first or second data stored in the first storage or the second storage on the basis of an error detection result of the first data error determining and the second data error determining.

12. The method of claim 11, wherein the outputting outputs the data stored in the address of the first storage when the data read out from the second storage has an error.

13. The method of claim 11, wherein the outputting outputs the data stored in the address of the second storage when the data read out from the first storage has an error.

14. The method of claim 11, wherein the first storage further comprises a backup storage.

15. The method of claim 14, further comprising storing the first data into the backup storage when the address of the first storage is matched with the error detected address.

* * * * *